W. W. WILCOX.
Strawberry Trellis.
No. 68,271. Patented Aug. 27, 1867.
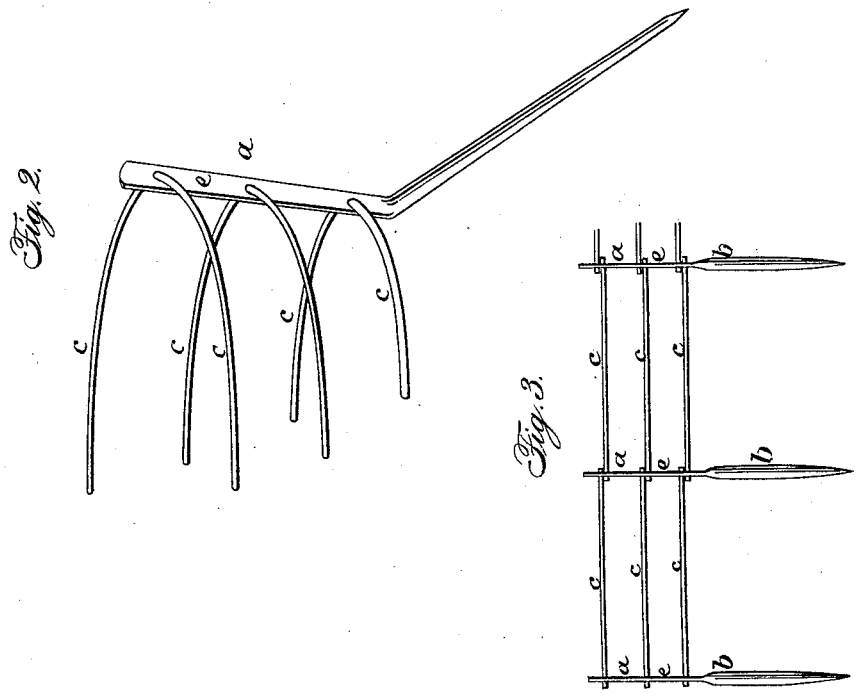
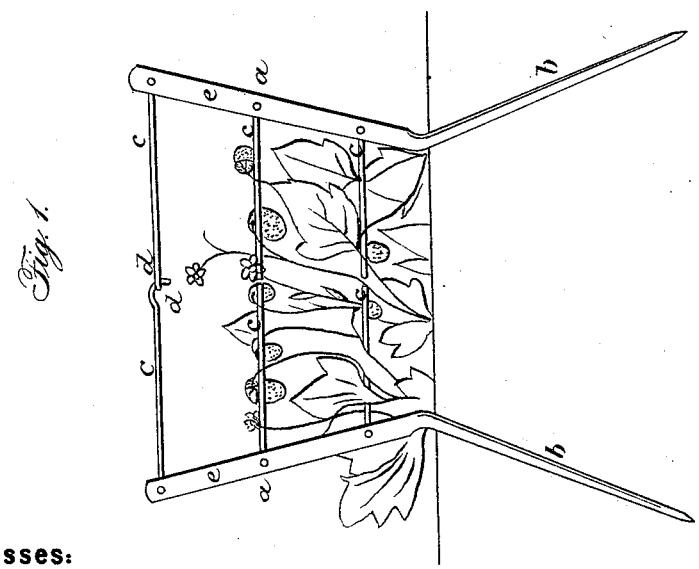
Witnesses:
Gustav Berg
Hermann Graz
Inventor:
Wm W Wilcox
per
Van Santwoort & Hauf
attys.

United States Patent Office.

WILLIAM W. WILCOX, OF MIDDLETOWN, CONNECTICUT.

Letters Patent No. 68,271, dated August 27, 1867.

---

IMPROVEMENT IN STRAWBERRY-TRELLIS.

---

*The Schedule referred to in these Letters Patent and making part of the same.*

---

TO ALL WHOM IT MAY CONCERN:

Be it known that I, WILLIAM W. WILCOX, of Middletown, in the county of Middlesex, and in the State of Connecticut, have invented a new and useful Improvement in Strawberry-Trellises; and I do hereby declare that the following is a full, clear, and exact description thereof, which will enable those skilled in the art to make and use the same, reference being had to the accompanying drawing, forming part of this specification, in which drawing—

Figure 1 is a sectional view, and represents my invention as it appears when in use, two trellises being shown arranged together on one "hill" of strawberry vines.

Figure 2 is a perspective view of a single trellis.

Figure 3 is a modification showing the posts of the trellis arranged in a row, having the supporting-arms C extending from one post, $e$, to another.

Similar letters indicate corresponding parts.

This invention relates to protecting strawberry plants and supporting their berries free from contact with the ground. Strawberry plants or vines are prone to lie upon the ground when the fruit is growing and ripening, and straw and hay are now extensively used to put beneath and around the plants to keep the fruit from the ground, but this process, called "mulching," is both tedious and disadvantageous, one of its disadvantages being that it prevents the ground from being cultivated while the "mulch" remains. My invention supersedes the process of "mulching" and other devices for protecting the berry from dust.

The letter $a$ designates the trellis. It consists of a portable frame of galvanized iron, but any other material will answer the required purpose, those materials, however, being preferred as, for instance, incorrodible metals or wood, which are not liable to rust. The frame is made of an upright post, $e$, whose lower end $b$ is sharp-pointed to allow it to enter the ground with facility, said lower end being bent to an angle with that part of the post which remains above the ground, so that it will not be liable to sink further into the ground by its own weight or by accidental pressure. The upper part of the post $e$ has a series of horizontal branching arms, $c$, which are nearly semicircular in this example, and which are separated from each other an inch or two, more or less. I do not wish to restrict myself to the form here shown of the arms $c$ or of the post which supports them, for both the arms and the post can be modified or varied in form without departing from my invention, which consists in a post or frame with branches or arms extending therefrom in one or more directions, supported in the ground by forcing the lower end of the post or frame into the soil, the whole forming a portable trellis. In fig. 1 I have shown two trellises or frames $a$, placed face to face, and interlocked by means of hooks, $d$, formed on the end of the upper arms $c$ $c$ of each trellis. The trellis may be used singly also, and the posts $e$ may have arms $c$ branching from the rear side, or they may have radial arms diverging in many directions, or the arms may be complete circles, or of any other desired shape. A little while before the fruit appears on the vines I arrange the trellises $a$ around a vine with care, and if the vine is large and heavy the tops of the trellises are hooked together so that the stalks will not fall backward on the ground. The sharp-pointed end $b$ of the post $e$ is crowded into the ground until the lower arm $c$ is about one or one and a half inch above the surface, more or less. The stalks fall naturally on the arms $c$ and are held up in easy positions. When vines are thus supported it is impossible for the fruit to become soiled, the berries being held up free from the ground, and high enough to escape being spattered with sand from the effects of heavy rains. The berries are also better exposed to the sun and air, the arrangement of the vines upon the branching arms $c$ causing them to be more open to the air than they are by ordinary methods of cultivation. My invention also allows the ground to be cultivated between the rows and between adjacent vines without disturbing them.

The present example of my invention is intended for use where strawberry vines are placed in "hills." When they are cultivated in rows the arms of one trellis are allowed to rest on those of the next in the series, and the arms can be stiffened by transverse bars to prevent them from becoming bent. My invention can also be modified by making the posts which support the vines heavy, so that they will maintain themselves upright when set on the ground without requiring to be fastened or sunk in the soil. When winter approaches I remove the trellises from the field and house them for preservation. If necessary for strength, I use two or more posts $e$ in making my trellis, but when I use stiff wire for the arms $c$ I find one bar to answer the purpose. The modification shown in red outlines in fig. 3 is intended for vines cultivated in rows, in which case the trellis or frame is continuous with the rows. I place the posts $e$ in or on the ground on both sides of a row, and extend the arms $c$ (made straight or crooked to suit the judgment of the gardener) from post to post. The vines lean on the bars, as before explained.

What I claim as new, and desire to secure by Letters Patent, is—

The strawberry-trellis $a$, made substantially as above described, with an upright post or posts, $e$, and branching arms $c$.

WILLIAM W. WILCOX.

Witnesses:
   GUSTAV BERG,
   J. VAN SANTVOORD.